United States Patent Office 3,453,624
Patented July 1, 1969

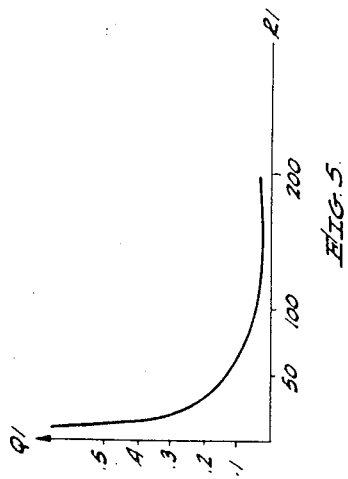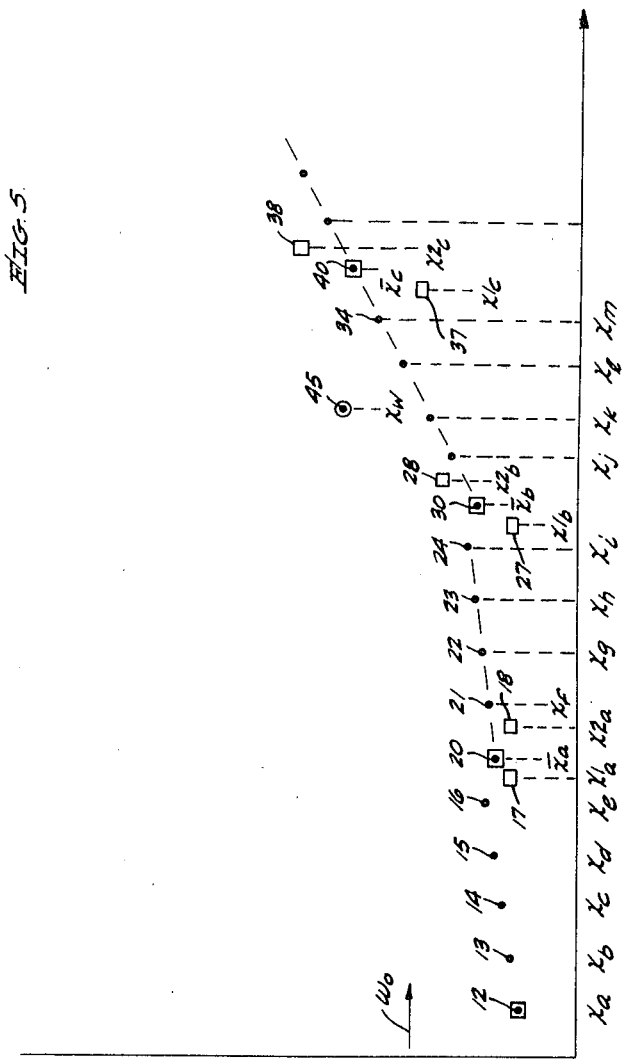

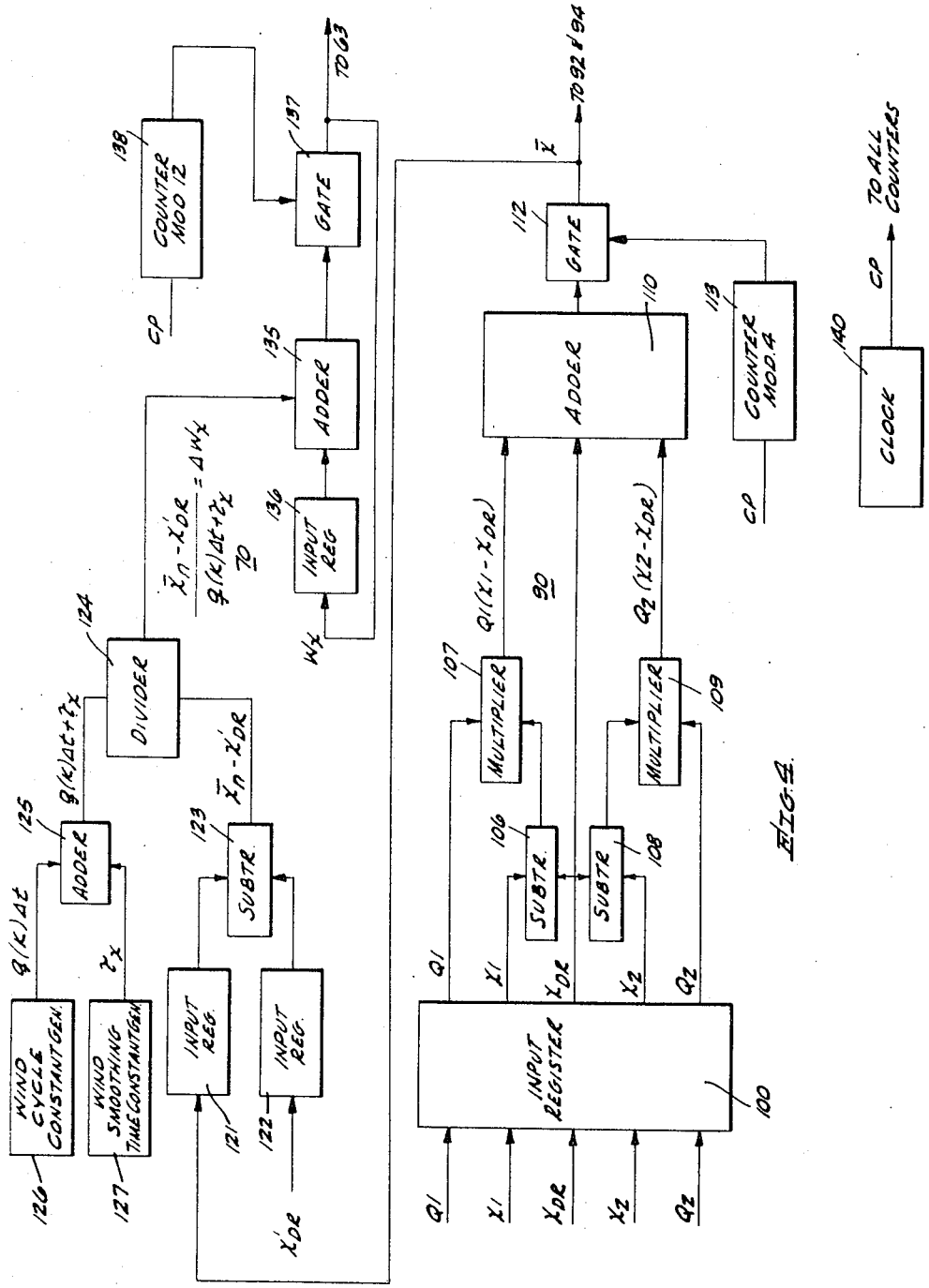

3,453,624
SYSTEM FOR DETERMINING CRAFT POSITION
Ronald J. Rockey, Pacific Palisades, Calif., assignor to Hughes Aircraft Company, Culver City, Calif., a corporation of Delaware
Filed Feb. 20, 1968, Ser. No. 706,934
Int. Cl. G01s 3/02
U.S. Cl. 343—112          10 Claims

ABSTRACT OF THE DISCLOSURE

A system for determining aircraft position is disclosed. It includes means which compute, during each minor cycle, an aircraft position by dead reckoning based on a previously computed position and the aircraft's speed and estimated wind velocity. Every few minor cycles the last computed position is updated to produce a smoothed position which is a function of the sum of the last dead-reckoned position and the weighted VORTAC measured positions derived from two CORTAC stations. A new wind velocity is estimated during every wind estimating cycle. The new wind velocity term is a function of a previously estimated wind velocity term and the difference between a smoothed position and a long term dead-reckoned position.

BACKGROUND OF THE INVENTION

Field of the invention

This invention generally relates to a system for use in craft navigation and, more particularly, to a system for determining the position of a navigable craft as a function of its velocity, heading and measured data.

Description of the prior art

The role and function of the presently existing very high frequency omnirange, distance measuring equipment and tactical air navigation (VOR/DME/TACAN) system in flight navigation are well known. Basically, the system consists of a relatively large number of stations, hereafter referred to as VORTAC stations, which transmit signals for flight navigation purposes. The coordinates or position of each station, as well as the frequency of the signals therefrom are known. A VOR/DME/TACAN or simply VORTAC receiver, aboard an aircraft in flight, which is properly tuned to the frequency of a station provides bearing and range information from which the pilot can compute the craft's position. At present, practically all commercial, military and many private airplanes are equipped with such receivers.

Theoretically, aircraft positions computed from VORTAC derived information should be very accurate. However, in practice it has been determined that noise conditions, which are ever present contribute to some error in the computed position. Furthermore, the error is directly related to the range of the craft from the VORTAC station.

Though the error in some cases is not particularly great, the sharp rise in air traffic, crowding the skies with aircrafts, has created a need for a system capable of computing the position of an aircraft with a degree of accuracy which is significantly greater than the accuracy with which such a position is presently computable. Such a need will be even greater in the near future if the present trend of increased air traffic continues.

OBJECTS AND SUMMARY OF THE INVENTION

It is a primary object of the present invention to provide a novel system for computing aircraft position.

Another object of the invention is the provision of a system which utilizes VORTAC information to derive aircraft position with a higher degree of accuracy than herebefore achievable.

A further object of this invention is to provide a system for computing in a novel manner aircraft position partially based on VORTAC information, whereby the effect of noise is greatly reduced.

These and other objects of the present invention are achieved by providing an airborne system which is assumed to receive VORTAC information from two separate VORTAC receivers that are simultaneously tunable to two different VORTAC stations. The system is also provided with aircraft heading signals, and with signals from an air data computer, which represent the aircraft's true air speed.

Briefly, the system of the invention derives, at the end of each position-smoothing period in a sequence of such periods, a smoothed value of aircraft position which is a function of the aircraft position as determined by VORTAC measurements, and the aircraft's position determined by dead reckoning as determined since the end of a previous position-smoothing period. Each position-smoothing period consists of a plurality of minor periods. The dead-reckoned (DR) position is updated at the end of each minor period by adding to a previously computed dead-reckoned position a value which represents the distance covered by the aircraft during such a minor period. Estimated wind in the particular direction may be used for increased accuracy to determine the distance.

The novel features of the invention are set forth with particularity in the appended claims. The invention will best be understood from the following description when read in conjunction with the accompanying drawings.

BRIEF DESCRIPTION OF THE DRAWINGS

FIGURE 1 is a multiposition two-dimensional diagram useful in explaining the invention;

FIGURES 3 and 4 are more detailed block diagrams of portions of the system shown in FIGURE 2; and FIGURE 5 is a diagram useful in explaining the operations of function generators shown in FIGURE 2.

DESCRIPTION OF THE PREFERRED EMBODIMENTS

Figure 2:
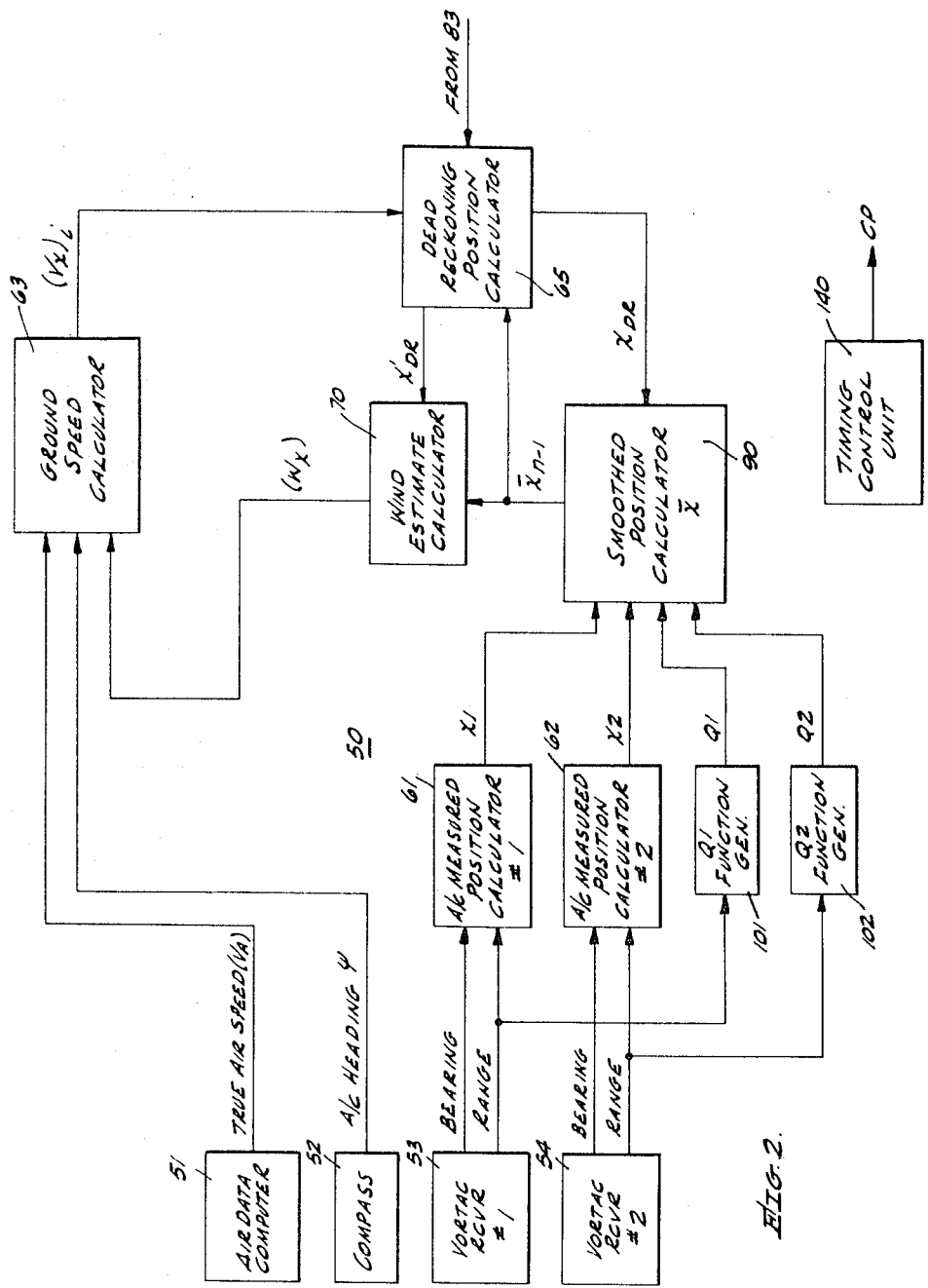
FIGURE 2 is an overall block diagram of one example of an embodiment of the present invention.

The basic principles of operation of the system of the present invention may best be explained by first outlining the various computations which the system performs. For explanatory purposes, the present invention will be described in conjunction with a cartesian coordinate system in which aircraft position is defined in terms of positions in two orthogonal directions, such as X and Y. Since the required computations to determine the craft position in each direction are the same, in the following description, only the computations required to determine the craft position in one direction, such as the X direction, will be described.

Briefly, the system updates the aircraft position by dead reckoning once every minor period or cycle. Once in every $k$ minor cycles, which define a smoothing or major cycle, a smoothed aircraft position is computed, as a weighted sum of the aircraft position, derived from VORTAC data from one or two receivers, and the last dead-reckoned position. Subsequent dead-reckoned positions are determined from the last smoothed position.

The required computations are expressed in the following equations:

$$\bar{X}_n = X_{DR} + Q1(X1 - X_{DR}) + Q2(X2 - X_{DR}) \quad (1)$$

$$X_{DR} = \overline{X}_{n-1} + \sum_{i=1}^{K}(V_x)_i \Delta t \qquad (2)$$

$$(V_x)_i = (V_A)_i \sin \Psi_i + W_x \qquad (3)$$

where $\overline{X}$ = aircraft smoothed position,
$X_{DR}$ = aircraft dead-reckoned position,
Q1 and Q2 = filter weights,
$V_{Ai}$ = aircraft true air speed at minor cycle $i$,
$\Psi_i$ = aircraft true heading at minor cycle $i$,
$W_x$ = latest estimate of wind in X direction,
$\Delta t$ = minor cycle time,
K = number of minor cycles per smoothing cycle,
X1 = X position as measured by VORTAC receiver 1,
X2 = X position as measured by VORTAC receiver 2.

Every $q$th smoothing cycle a new estimate of wind is computed. The wind estimation computations may be expressed as:

$$(W_x)_n = (W_x)_{n-q} + \frac{\overline{X}_n - X'_{DR}}{q(k)\Delta t + \tau_x} \qquad (4)$$

$$X'_{DR} = \overline{X}_{n-q} + \sum_{i=1}^{qk}(V_x)_i \Delta t \qquad (5)$$

where $(W_x)_n$ = new value of wind estimate,
$(W_x)_{n-q}$ = old value of wind estimate,
$X'_{DR}$ = long term X position by dead-reckoning,
$\tau_w$ = wind smoothing time constant.

The computations, hereinbefore expressed in terms of equations, may further be explained in conjunction with FIGURE 1. Therein aircraft positions, updated by dead-reckoning, are represented by small black circles, aircraft positions derived from VORTAC information by small squares, and smoothed aircraft positions by squares which enclose small circles. For the particular example, it is assumed that:

$\Delta t = 1$ sec
$k = 4$
$q = 3$

It is further assumed that point 12 represents an initial smoothed aircraft position, with an X coordinate $X_a$ at a time $t_0$, which represents the start of a minor cycle, a VORTAC or smoothing cycle and a wind estimate cycle. In addition it is assumed that at $t_0$ the estimated wind in the X direction is $(W_x)_0$, as represented by arrow $W_0$.

As the aircraft proceeds in flight, after one second, at a time $t_1$, the position is updated by dead-reckoning as represented by point 13, with an X coordinate $X_b$. The latter term is derived by computing Equations 3 and 2. To derive $(V_x)_{t_1}$, i.e., the velocity in the X direction at time $t_1$, the true air speed $(V_A)_{t_1}$ and the aircraft heading $\Psi_{t_1}$ supplied to the system are used, together with the last wind estimate $(W_x)$. Thereafter Equation 2 is solved. For the specific example, $$X_b = X_a + (V_A)_{t_1} \sin \Psi_{t_1} + (W_x)_0 \cdot 1$$

This process is repeated during every succeeding second, at times $t_2$, $t_3$, $t_4$, to update by dead-reckoning the aircraft's position, as represented in FIGURE 1 by points 14, 15 and 16, with X coordinates $X_c$, $X_d$ and $X_e$, respectively. $X_e$ may also be expressed as $(X_{DR})_{t_4}$ which indicates a dead-reckoned X position at time $t_4$.

Since $t_4$ is the beginning of a new smoothing cycle, the aircraft's position, as measured by the two VORTAC receivers, is used. In FIGURE 1, squares 17 and 18, with X coordinates $X1_a$ and $X2_a$, represent the aircraft's position as measured by VORTAC receivers 1 and 2, respectively. At this point in time the terms $X_e = (X_{DR})_{t_4}$, $X1_a$ and $S2_a$ are used to provide a smoothed position, designated by numeral 20 with an X coordinate $\overline{X}_a$, where, $$\overline{X}_a = (X_{DR})_{t_4} + Q1(X1_a - (X_{DR})_{t_4}) + Q2(X2_a - (X_{DR})_{t_4})$$

The filter weights Q1 and Q2 may be constants. Preferably, however, they vary as a function of range as well as a function of the number of receivers which provide valid VORTAC information. Hereafter, one example of deriving these weights will be explained in detail.

Once the smoothed position $\overline{X}_a$ (point 20) is derived, it is used during each of the next four succeeding seconds at times $t_5$, $t_6$, $t_7$ and $t_8$, to successively update the craft position as represented by points 21, 22, 23 and 24 with X coordinates $X_f$, $X_g$, $X_n$ and $X_i$. At time $t_8$ the VORTAC measurements are used once more to provide craft positions 27 and 28, from which a smoothed position 30 is computed in accordance with Equation 1. The X coordinate of position 30 is $\overline{X}_b$, where $$\overline{X}_b = X_i + Q1(X1_b - X_i) + Q2(X2_b - X_i)$$

Thereafter, the third smoothing cycle begins so that four seconds later at a time $t_{12}$ the dead-reckoned position 34 of the aircraft has an X coordinate $X_m$.

$$X_m = (X_{DR})_{t_{12}}$$

At time $t_{12}$ the VORTAC measured aircraft positions are represented by squares 37 and 38, with X coordinates $X1_c$ and $X2_c$. These positions, together with $(X_{DR})_{t_{12}}$ and Q1 and Q2 are used to derive $\overline{X}_c$ of a smoothed position 40.

Since as hereinbefore assumed $q=3$, $t_{12}$ represents the start of a new wind cycle. Thus, it is necessary to update the wind estimate in accordance with Equation 4, which is rewritten herein for convenience:

$$(W_x)_n = (W_x)_{n-q} + \frac{\overline{X}_n - X'_{DR}}{q(k)\Delta t + \tau_w} \qquad (4)$$

In the present example, $(W_x)_{n-q} = (W_x)_0$, $\overline{X}_n = \overline{X}_c$, $q(k)\Delta t = (3)(4)(1) = 12$, and $\tau_w$ is a wind smoothing time constant. The term $X'_{DR}$ is the long term X position by dead-reckoning which, in FIGURE 1, is designated $X_w$ of a long term dead-reckoned positioned 45. Position 45 is derived in accordance with Equation 5 in which the position 12 at $t_0$ is updated by dead-reckoning during each of the 12 seconds which define the wind cycle. Thus, in the present example, the new estimate of wind in the X direction for use during the next wind cycle may be expressed as $$(W_x)_1 = (W_x)_0 + \frac{\overline{X}_c - X_w}{(3)(4)(1) + \tau_x}$$

Summarizing the foregoing description, in the system of the present invention a smoothed aircraft position is computed at the beginning of each smoothing cycle which consists of a plurality of minor cycles. The smoothed position is derived as a function of the sum of a last derived dead-reckoned position and weighted VORTAC measured position. The smoothed position is used during a succeeding smoothing cycle, during each minor cycle thereof to update the position by dead-reckoning. Several smoothing cycles define a wind estimate cycle.

At the beginning of each wind estimate cycle the wind is estimated on the basis of a prior wind estimate and the difference in positions between a smoothed position and a long term dead-reckoned position.

Reference is now made to FIGURE 2 which is a block diagram of an exemplary embodiment of the system of the present invention. The system, generally designated by numeral 50, is assumed to be supplied with true air speed $V_A$, from an air data computer 51, and aircraft heading $\Psi$ from a compass 52. Also, the system 50 is supplied with aircraft range and bearing signals from a VORTAC receiver #1, designated by numeral 53 and aircraft range and bearing signals from a VORTAC receiver #2, designated by numeral 54.

The receiver 1 outputs are supplied to a measured aircraft position calculator 61, whose function is to calculate the X coordinate of the craft, such as X1$_a$, X1$_b$ and X1$_c$, diagrammed in FIGURE 1, on the basis of the range of the aircraft and its bearing with respect to a VORTAC station, to which receiver 53 is tuned. Similarly, a second measured aircraft position calculator 62 responds to the outputs of receiver 2 (54) to provide the X2 positions, such as X2$_a$ and X2$_b$, which are computed from the range and bearing of the aircraft from a second VORTAC station. Since such calculators often form an integral part of VORTAC receivers and are known by those familiar with devices, using receiver-produced range and bearing signals, these two calculators will not be described in any further detail.

As seen from FIGURE 2 the true air speed V$_A$ and aircraft heading $\Psi$ are supplied to a ground speed calculator 63. The calculator 63 is also supplied with the estimated wind W$_x$ (in the $x$ direction) in order to compute V$_x$ during each minor cycle $\Delta t$, in accordance with Equation 4 and supply a signal, corresponding thereto, to a dead-reckoning position calculator 65. The function of the latter is to use V$_x$ to update the aircraft position, as herebefore explained.

Figure 3:
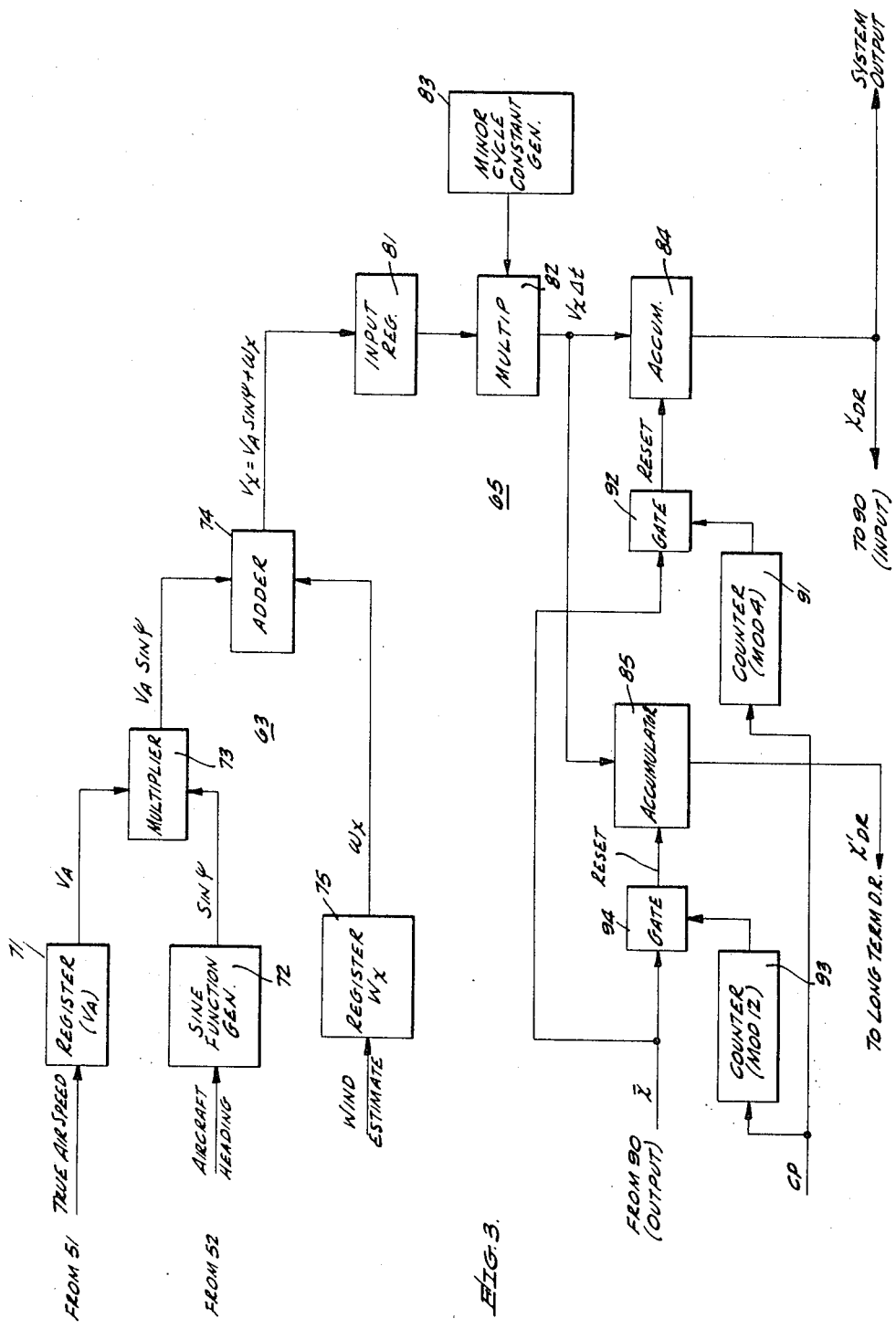

One specific embodiment of calculators 63 and 65 is diagrammed in FIGURE 3, to which reference is made herein. Therein, the calculator 63 is shown consisting of a register or storage unit 71 which holds the latest true air speed V$_A$, and a sine-function generator 72 which produces a signal, which is the sine of the input signal $\Psi$. The generator 72 may be dispensed with if the aircraft heading is supplied as sin $\Psi$. The outputs of 71 and 72 are multiplied in a multiplier 73 whose output, $V_A \sin \Psi$, is added in adder 74 to the output of a register 75 which holds the last wind estimate, W$_x$. This signal V$_x$ is supplied to register 75 from a wind estimate calculator 70 (see FIGURE 1), which will be described hereafter in sufficient detail.

The output V$_x$ of adder 74 is supplied to an input register or storage unit 81 of calculator 65. The output of register 81, which is assumed to be reset at the start of each minor cycle in order to store the latest V$_x$ term, is supplied to a multiplier 82, to which the output of a generator 83 is also applied. Generator 83 provides a constant signal, representing the duration of a minor cycle, so that the output of 82 represents the term V$_x \cdot \Delta t$. This output is supplied to two accumulators 84 and 85, which perform the computations expressed in Equations 2 and 5, respectively.

Briefly, the output of accumulator 84, which is X$_{DR}$, represents the system's output. The signal X$_{DR}$ is also supplied to a calculator 90 (see FIGURE 1), having the function of computing the smoothed position at the start of each smoothing cycle. After the smoothed position $\overline{X}$ is computed, the accumulator 84 is reset and the last computed $\overline{X}$ position is stored in the accumulator 84. The resetting of accumulator 84 and the subsequent storing of $\overline{X}$ are controlled by the output of a counter 91 and a gate 92. The count of the counter 91 is incremented by one once during every minor cycle. Counter 91 is a MOD 4 type since, in the present example, four (4) minor cycles are included in each smoothing cycle.

The function of accumulator 85 is to produce the long term dead-reckoned position X'$_{DR}$. With four minor cycles per smoothing cycle and three smoothing cycles per wind estimate cycle, a MOD 12 counter 93 is used to reset accumulator 85 after the term X'$_{DR}$ has been used by the wind calculator 70 to compute a new wind estimate. The output of counter 93 is also used to open a gate 94 in order to enable a last computed smoothed position $(\overline{X})$ to be stored in the accumulator 85 as the start value for the accumulation of a subsequent long term dead-reckoned position.

In the example, described in conjunction with FIGURE 1, at time $t_{12}$ the term X$_w$ representing X coordinate of the long term dead-reckoned position 45 is sent to calculator 70. Then, accumulator 85 is reset and after the new smoothed position 40 with an X coordinate $\overline{X}_c$ is calculated in 90, gate 94 is opened to store $\overline{X}_c$ in 85.

The operation of the wind calculator 70 and the smoothed position calculator 90 may be explained in further detail by referring to FIGURE 4, which is a block diagram of an exemplary embodiment of the two calculators. Before proceeding to describe the two calculators it should be recalled that calculator 70 has to update the wind estimate, once during every wind cycle, assumed to consist of 12 minor cycles by computing Equation 4, which is rewritten herein.

$$(W_x)_n = (W_x)_{n-q} + \frac{\overline{X}_n - X'_{DR}}{q(k)\Delta t + \tau_x} \quad (4)$$

Similarly, once every smoothing cycle, consisting of four minor cycles, calculator 90 computes a smoothed position by calculating Equation 1, which is rewritten herein.

$$\overline{X} = X_{DR} + Q1(X1 - X_{DR}) + Q2(X2 - X_{DR}) \quad (1)$$

Calculator 90 may consist of input registers generally designated by numeral 100 which hold the terms X1, X2 and X$_{DR}$, supplied from calculators 61, 62 and 65, respectively. Registers 100 also hold the filter weights Q1 and Q2, supplied from function generators 101 and 102 (see FIGURE 2). A subtractor 106 subtracts X$_{DR}$ from X1 to form $X1 - X_{DR}$, which is multiplied in 107 by Q1. A similar subtractor-108-multiplier-109 combination is used to generate the term $Q2(X2 - X_{DR})$. An adder 110 combines the outputs of 107 and 109 with X$_{DR}$ to form the smoothed position term $\overline{X}$. However, since the smoothed position is required only at the beginning of each smoothing cycle, consisting of four ($n=4$) minor cycles, the output of adder 110 is supplied to calculators 65 and 70 (see FIGURE 2) through a gate 112, controlled by a MOD 4 counter 113. Thus, only at the beginning of each smoothing cycle is a new smoothing position term produced.

The wind estimate calculator 70 is shown (in FIGURE 4) comprising an input register 121 to which the smoothed position $\overline{X}$ is supplied. A similar register 122 holds the last received dead-reckoning term X'$_{DR}$ which represents the output of accumulator 85 (see FIGURE 3). The outputs of the two registers (121 and 122) are combined in subtractor 123 to produce a term $\overline{X} - X'_{DR}$ which is supplied to a divider 124. The output of an adder 125, which combines the terms $q(k)\Delta t$ and $\tau_x$ generated by generators 126 and 127, is also supplied to divider 124, whose output represents the term $$\frac{\overline{X} - X'_{DR}}{q(k)\Delta t + \tau_x}$$

This output from the divider 124 is added by adder 135 to the output of a register 136 which holds a previously estimated wind term W$_x$. Thus, the output of adder 135 represents the new wind estimate. Since, however, a new wind estimate is required only at the start of each wind estimate cycle, the output of adder 135 is supplied to register 75 (see FIGURE 3) of calculator 63 through a gate 137, controlled by a MOD 12 counter 138. Counter 138 is a MOD 12 type since in the present example the wind cycle is assumed to consist of 12 minor cycles ($nq = 4 \times 3 = 12$).

The various counters, arithmetic units, generators, registers and other system units, herebefore described, all respond to clock pulses CP, supplied from a clock 140 (FIGURE 4) that serves as a timing and control unit, which is designated in FIGURE 2 by the same numeral, 140. The time or period between successive clock pulses equals the minor cycle period which in the present example is one (1) second. Thus, each clock pulse defines a minor cycle.

It should be apparent that since the start of certain minor cycles also define the starts of smoothing cycles and wind estimate cycles, the signals used to enable the various gates and reset the accumulators should occur in proper time relationships which enable certain signals to be supplied before the supplying element or circuit is reset or supplied with a new term. For example, at the beginning of each minor cycle, the aircraft position is represented by $X_{DR}$ from accumulator 84. At the beginning of a smoothing cycle accumulator 84 should be reset only after $X_{DR}$ has been supplied to calculator 90 for use in calculating a new $\overline{X}$ term. Similarly, setting accumulator 84 with the new $\overline{X}$ term should occur after the accumulator has been first reset.

As is appreciated by those familiar with circuit design, the sequencing of the various control signals may be accomplished by using selected delay units in order to properly delay the control signals with respect to one another. Since the use of such units is well known, they are deleted from the figures for clarity reasons. Also, it is to be understood that the various units and circuits in accordance with the invention may be of any suitable type, such as circuits utilizing digital or analog principles.

From the foregoing it should be apparent that the calculator 63 (FIGURE 3) calculates aircraft velocity during each minor cycle in accordance with Equation 3, while the accumulators 84 and 85 of calculator 65 (FIGURE 3) operate in accordance with Equations 2 and 5, respectively. Likewise, calculators 70 and 90 (FIGURE 4) operate to calculate the terms expressed in Equations 4 and 1, respectively.

Although the various calculators are shown in FIGURES 3 and 4 as separate units, each with its separate registers and arithmetic-performing units, such as adders, subtractors, etc., it should be appreciated that the number of the units could be reduced by time sharing them, as is done in properly programmed data processors or computers. Therefore, the described arrangements should be regarded only as examples of circuits, capable of calculating the various terms, in accordance with the teachings disclosed herein.

As previously pointed out, the filter weights Q1 and Q2 are supplied to calculator 90 from generators 101 and 102 (FIGURE 2). These weights may be chosen to be of constant values, in which case generators 101 and 102 would produce constant-level outputs. Preferably, however, Q1 and Q2 are made to be inverse functions of the range siganls from receivers 53 and 54, respectively. One example of such a relationship is diagrammed in FIGURE 5, which is a graph of Q1 vs. R1, where R1 represents the range signals from receiver 53, in miles. Clearly, if for any reason signals from either receiver are invalid the filter weight related thereto is set to zero, thereby eliminating the effect of the position measured by such a receiver on the computed smoothed position $\overline{X}$.

If desired, when signals from both VORTAC receivers are valid, each filter weight may be made a function of the range signals from both receivers. For example, assuming that the range signals from the two VORTAC receivers are R1 and R2, Q1 and Q2 may be calculated to be:

$$Q_1 = \frac{\sqrt{2}R2}{R1+R2} Q1_1$$

and $$Q_2 = \frac{\sqrt{2}R1}{R1+R2} Q2_1$$

where, $Q1_1$ = filter weight as an inverse function of R1 only;
$Q2_1$ = filter weight as an inverse function of R2 only.

In such a case, generators 101 and 102 (FIGURE 2) would generate $Q1_1$, and $Q2_1$. These would be multiplied by the terms $$\frac{\sqrt{2}R2}{R1+R2} \text{ and } \frac{\sqrt{2}R1}{R1+R2}$$

respectively to produce the filter weights Q1 and Q2 which would be supplied to calculator 90.

There has accordingly been shown and described herein a system and method for updating the position of an aircraft in flight as a function of at least its velocity and signals from at least one station, such as a VORTAC station, which transmits signals used to measure and determine the aircraft's position. Once every minor cycle the aircraft's position is updated by dead-reckoning computations, which take into account the aircraft's velocity and preferably also an estimated wind term.

Every few minor cycles, which represent a smoothing cycle, the signals from the VORTAC receivers and the last computed dead-reckoned aircraft position are weighted to produce a smoothed position. The smoothed position is used in the dead-reckoning computations during the succeeding smoothing cycle. In addition every few smoothing cycles, which together define a wind estimate cycle, a new wind term is estimated.

Although particular embodiments of the invention have been described and illustrated herein, it is recognized that modifications and variations may readily occur to those skilled in the art and consequently it is intended that the claims be interpreted to cover such modifications and equivalents.

What is claimed is:
1. A system for determining craft position comprising:
first means for defining a sequence of first time intervals;
second means to which craft velocity signals are applied for updating, during each first time interval, the craft's position as a function of the craft's position at a preceding first time interval and the craft velocity; and
third means to which measured craft position signals are supplied for producing, once every $n$ first time intervals, a smoothed craft position as a function of the last updated craft position and the measured craft position signals.

2. The system as recited in claim 1 wherein said measured craft position signals are supplied from first and second VORTAC receivers tuned to two different VORTAC stations.

3. The system as recited in claim 2 wherein the smoothed craft position in a first direction X is $\overline{X}$ where $$\overline{X} = X_{DR} + Q1(X1 - X_{DR}) + Q2(X2 - X_{DR})$$

wherein $X_{DR}$ is the last updated craft position in the X direction, X1 and X2 are measured craft positions supplied by said first and second VORTAC receivers and Q1 and Q2 are filter weights which are functions of range signals from said first and second receivers, respectively.

4. The system as recited in claim 1 wherein said system further includes means for producing, during every wind-estimating interval consisting of $nq$ first time intervals, a term representing an estimated wind velocity, and wherein said second means include means responsive to the latest estimated wind velocity for further updating the craft's position as a function thereof.

5. The system as recited in claim 4 wherein said measured craft position signals are supplied from first and second VORTAC receivers tuned to two different VORTAC stations.

6. The system as recited in claim 5 wherein the smoothed craft position in a first direction X is $\overline{X}$ where $$\overline{X} = X_{DR} + Q1(X1 - X_{DR}) + Q2(X2 - X_{DR})$$

wherein $X_{DR}$ is the last updated craft position in the X direction, X1 and X2 are measured craft positions supplied by said first and second VORTAC receivers and Q1 and Q2 are filter weights which are functions of range signals from said first and second receivers, respectively.

7. A system for determining the position of a navigable aircraft in a selected direction, comprising:
first means for defining a sequence of first time intervals;
second means for receiving aircraft heading and velocity signals during each first time interval and for updating the position of said aircraft in said direction as a function of the aircraft's heading, its velocity, the duration of said first time interval and the updated aircraft position during a preceding first time interval;
third means responsive to signals from navigation stations for determining a measured aircraft position as a function of the signals from each of said stations; and
fourth means for producing a smoothed aircraft position as a function of the last updated aircraft position and the measured aircraft positions.

8. The system as recited in claim 7 wherein each measured aircraft position is determined from the signals from each navigation station which represent range and bearing of said aircraft from the station.

9. The system as recited in claim 8 wherein signals are received from two navigation stations which are VORTAC stations, and wherein said third means produce a smoothed position $\bar{X}$, where $$\bar{X} = X_{DR} + Q1(X1 - X_{DR}) + Q2(X2 - X_{DR})$$

and $X_{DR}$ represents a last updated aircraft position, X1 and X2 represent measured aircraft positions produced as a function of signals from the two VORTAC stations and Q1 and Q2 are filter weights, said system including means for generating Q1 and Q2 as functions of the range signals from said two VORTAC receivers.

10. A system for determining aircraft position as a function of smoothed measured positions which are derived from signals from VORTAC stations, comprising:
first means for defining a sequence of first time intervals;
second means for defining a term representative of estimated wind in a selected direction in which the position of the aircraft is to be determined;
third means to which aircraft heading and velocity signals are supplied for updating, during each first time interval, the aircraft position as a function of a last updated position, the aircraft heading and velocity since the last updating and said estimated wind term;
fourth means for receiving signals from a first VORTAC station to determine a first measured aircraft position X1, as a function of the aircraft's range and bearing from said first VORTAC station;
fifth means for receiving signals from a second VORTAC station to determine a second measured aircraft position X2, as a function of the aircraft's range and bearing from said second VORTAC station; and
sixth means for providing a smoothed aircraft position, $\bar{X}$, where $$\bar{X} = X_{DR} + Q1(X1 - X_{DR}) + Q2(X2 - X_{DR})$$

wherein $X_{DR}$ is the last updated aircraft position and Q1 and Q2 are terms which are functions of the range of the aircraft to said first and second VORTAC stations, respectively.

References Cited

UNITED STATES PATENTS

| | | | |
|---|---|---|---|
| 3,070,796 | 12/1962 | Gray | 343—112 |
| 3,103,579 | 9/1963 | Green | 343—112 X |

RICHARD A. FARLEY, *Primary Examiner.*

RICHARD E. BERGER, *Assistant Examiner.*

U.S. Cl. X.R.

235—150.27; 343—106